(12) United States Patent
Kawauchi et al.

(10) Patent No.: US 7,929,628 B2
(45) Date of Patent: Apr. 19, 2011

(54) OFDM RECEIVER AND OFDM SIGNAL RECEIVING METHOD

(75) Inventors: Hidetoshi Kawauchi, Kanagawa (JP); Masayuki Hattori, Kanagawa (JP)

(73) Assignee: Sony Corporation (JP)

( * ) Notice: Subject to any disclaimer, the term of this patent is extended or adjusted under 35 U.S.C. 154(b) by 842 days.

(21) Appl. No.: 11/900,636

(22) Filed: Sep. 11, 2007

(65) Prior Publication Data

US 2008/0075186 A1 Mar. 27, 2008

(30) Foreign Application Priority Data

Sep. 12, 2006 (JP) ................. P2006-247097

(51) Int. Cl.
*H04L 27/28* (2006.01)
(52) U.S. Cl. ............... 375/260; 375/316
(58) Field of Classification Search .............. 375/260, 375/316; 370/208–210
See application file for complete search history.

(56) References Cited

U.S. PATENT DOCUMENTS

| | | | |
|---|---|---|---|
| 2003/0072395 A1* | 4/2003 | Jia et al. ............... | 375/341 |
| 2004/0252629 A1* | 12/2004 | Hasegawa et al. ......... | 370/208 |
| 2006/0285599 A1* | 12/2006 | Seki et al. ............ | 375/260 |
| 2007/0030798 A1* | 2/2007 | Okada .................. | 370/208 |
| 2007/0230635 A1* | 10/2007 | Wilhelmsson et al. ...... | 375/345 |
| 2009/0213948 A1* | 8/2009 | Ma et al. ............... | 375/260 |

OTHER PUBLICATIONS

Receiver for Digital Terrestrial Sound Broadcast Standard (Desirable Specification) ARIB STD-B30, Association of Radio Industries and Businesses (2000).
Transmission System for Digital Terrestrial Sound Broadcasting, ARIB STD-B29, Association of Radio Industries and Businesses (1999).

* cited by examiner

*Primary Examiner* — Emmanuel Bayard
(74) *Attorney, Agent, or Firm* — Lerner, David, Littenberg, Krumholz & Mentlik, LLP

(57) ABSTRACT

An OFDM receiver may include OFDM-signal receiving means for receiving an orthogonal frequency division multiplexing (OFDM) signal; channel-characteristic estimating means for estimating a channel characteristic using pilot signals in the OFDM signal received by the OFDM-signal receiving means; and transmission-distortion compensating means for applying, on the basis of the channel characteristic estimated by the channel-characteristic estimating means, processing for compensating for transmission distortion to the OFDM signal received by the OFDM-signal receiving means. The channel-characteristic estimating means may include plural kinds of time-direction-channel estimating means used for the estimation of a channel characteristic, and switching control means for switching these estimating means according to a state of a channel.

9 Claims, 17 Drawing Sheets

WITHOUT FLUCTUATION

FLUCTUATION IS PERIODIC

FLUCTUATION IS RANDOM

WITHOUT FLUCTUATION

THRESHOLD

FLUCTUATION IS PERIODIC

FLUCTUATION IS RANDOM
THRESHOLD

US 7,929,628 B2

OFDM RECEIVER AND OFDM SIGNAL RECEIVING METHOD

CROSS-REFERENCE TO RELATED APPLICATIONS

This application claims priority from Japanese Patent Application No. JP 2006-247097 filed in the Japanese Patent Office on Sep. 12, 2006, the entire content of which is incorporated herein by reference.

BACKGROUND OF THE INVENTION

1. Field of the Invention

The present invention relates to an OFDM receiver and an OFDM signal receiving method for receiving an orthogonal frequency division multiplexing (OFDM) signal and demodulating the OFDM signal.

2. Description of the Related Art

A modulation system called an orthogonal frequency division multiplexing (OFDM) system is used as a modulation and demodulation system of a terrestrial digital broadcasting system. This OFDM system is a system for providing a large number of orthogonal sub-carriers in a transmission band, allocating data to amplitudes and phases of the respective sub-carriers, and digitally modulating a signal according to PSK (Phase Shift Keying) or QAM (Quadrature Amplitude Modulation).

The OFDM system has a characteristic that, since the transmission band is divided by the large number of sub-carriers, although a band per one sub-carrier is narrowed and modulation speed is reduced, transmission speed as a whole is the same as that in the modulation system in the past. The OFDM system also has a characteristic that, since the large number of sub-carriers are transmitted in parallel, symbol speed is reduced. Therefore, in the OFDM system, a time length of a multi-path relative to a time length of a symbol can be reduced and transmission is less susceptible to a multi-path interference. Further, the OFDM system has a characteristic that, since data is allocated to the plural sub-carriers, a transmission and reception circuit can be formed by using, during modulation, an IFFT (Inverse Fast Fourier Transform) arithmetic circuit that performs inverse Fourier transform and using, during demodulation, an FFT (Fast Fourier Transform) arithmetic circuit that performs Fourier transform.

Since the OFDM system has the characteristics described above, the OFDM system is often applied to the terrestrial digital broadcast that is intensely affected by the multi-path interference. As the terrestrial digital broadcast employing such an OFDM system, there are standards such as DVB-T (Digital Video Broadcasting-Terrestrial), ISDB-T (Integrated Services Digital Broadcasting-Terrestrial) and ISDB-TSB (Integrated Services Digital Broadcasting-Terrestrial Sound Broadcasting) (see, for example, "Receiver for Terrestrial Digital Sound Broadcast-Standard (Desirable Specifications) ARIB STD-B30 version 1.1", Association of Radio Industries and Businesses, decided on May 31, 2001 and revised on Mar. 28, 2002 and "Transmission System for Terrestrial Digital Sound Broadcast ARIB STD-B29 version 1.1", Association of Radio Industries and Businesses, decided on May 31, 2001 and revised on Mar. 28, 2002).

A transmission signal in the OFDM system is transmitted by a unit of a symbol called an OFDM symbol. This OFDM symbol includes an effective symbol that is a signal period in which IFFT is performed during transmission and a guard interval in which a waveform of a part of the latter half of this effective symbol is directly copied. This guard interval is provided in the former half of the OFDM symbol. In the OFDM system, such a guard interval is provided to improve multi-path resistance. Plural OFDM symbols are collected to form one OFDM transmission frame. For example, in the ISDB-T standard, ten FDM transmission frames are formed by two hundred four OFDM symbols. Insertion positions of pilot signals are set with this unit of OFDM transmission frames as a reference.

In the OFDM system in which the modulation of a QAM system is used as a modulation system for each of the sub-carriers, characteristics of the amplitude and the phase are different for each of the sub-carriers because of the influence of the multi-path and the like during transmission. Therefore, on a reception side, it is necessary to equalize a reception signal to make the amplitude and the phase for each of the sub-carriers equal. In the OFDM system, on a transmission side, pilot signals of a predetermined amplitude and a predetermined phase are discretely inserted in a transmission symbol in a transmission signal. On the reception side, a frequency characteristic of a channel is calculated using the amplitude and the phase of the pilot signals and a reception signal is equalized according to the calculated characteristic of the channel.

The pilot signals used for calculating a channel characteristic are referred to as scattered pilot (SP) signals.

SUMMARY OF THE INVENTION

As a method of estimating a time direction channel in the OFDM receiver, there are known a method of estimating a time direction channel using an average-type estimator, a method of estimating a time direction channel using an interpolation-type estimator, and a method of estimating a time direction channel using a prediction-type estimator. All of the methods have advantages and disadvantages in characteristics thereof. The prediction-type estimator can accurately estimate a channel for a static channel without temporal fluctuation and a channel in which temporal fluctuation is periodic. However, the prediction-type estimator fails in prediction and may be unable to correctly estimate a channel for a channel that fluctuates at random as known in Typical Urban. On the other hand, the interpolation-type estimator is more excellent than the prediction-type estimator in that the interpolation-type estimator can estimate a channel without a very significant error even in a channel that fluctuates at random. However, when it is attempted to attain performance equivalent to that of the prediction-type estimator in a static channel or a channel that fluctuates periodically, an enormous number of taps are necessary and, therefore, a memory for holding data is also necessary. The average-type estimator attains excellent performance when the fluctuation in a channel is extremely gentle but, when fluctuation is large, the average-type estimator may be unable to follow the fluctuation.

Therefore, there is a need for providing an OFDM receiver and an OFDM signal receiving method that can receive an OFDM signal without a substantial increase in size of a circuit regardless of whether a channel is static, temporal fluctuation in the channel is periodic, or temporal fluctuation in the channel is random.

Other needs and specific advantages derived therefrom will be made more obvious from the following explanations of embodiments.

According to an embodiment of the present invention, in order to attain high performance without a substantial increase in size of a circuit regardless of whether a channel is static, temporal fluctuation in the channel is periodic, or temporal fluctuation in the channel is random, the average-type estimator, the interpolation-type estimator, and the prediction-type estimator may be switched and used.

According to an embodiment of the present invention, there is provided an OFDM receiver which may include OFDM-signal receiving means for receiving an orthogonal frequency division multiplexing (OFDM) signal, channel-characteristic estimating means for estimating a channel characteristic using pilot signals in the OFDM signal received by the OFDM-signal receiving means, and transmission-distortion compensating means for applying, on the basis of the channel characteristic estimated by the channel-characteristic estimating means, processing for compensating for transmission distortion to the OFDM signal received by the OFDM-signal receiving means. The channel-characteristic estimating means may include plural kinds of time-direction-channel estimating means used for the estimation of a channel characteristic and switching control means for switching these estimating means according to a state of a channel.

According to another embodiment of the present invention, there is provided an OFDM signal receiving method of receiving an orthogonal frequency division multiplexing (OFDM) signal, estimating a channel characteristic using pilot signals in the received OFDM signal, and applying, on the basis of the estimated channel characteristic, processing for compensating for transmission distortion to the received OFDM signal, the OFDM signal receiving method may include estimating a Doppler spectrum for the received OFDM signal and switching, according to the estimated Doppler spectrum, plural kinds of time-direction-channel estimating means used for the estimation of a channel characteristic.

According to the embodiments of the present invention, the prediction-type estimator may be used when a channel is static or when temporal fluctuation in the channel is periodic. When temporal fluctuation in the channel is random, it may be possible to switch the prediction-type estimator to the interpolation-type estimator to estimate a time direction channel. In other words, it may be possible to select an appropriate estimation method according to a state of the channel and attain excellent reception performance in all channels.

DETAILED DESCRIPTION

Embodiments of the present invention will be hereinafter explained in detail with reference to the accompanying drawings. It goes without saying that the present invention is not limited to the embodiments described below and can be modified arbitrarily without departing from the spirit of the present invention.

Figure 1:
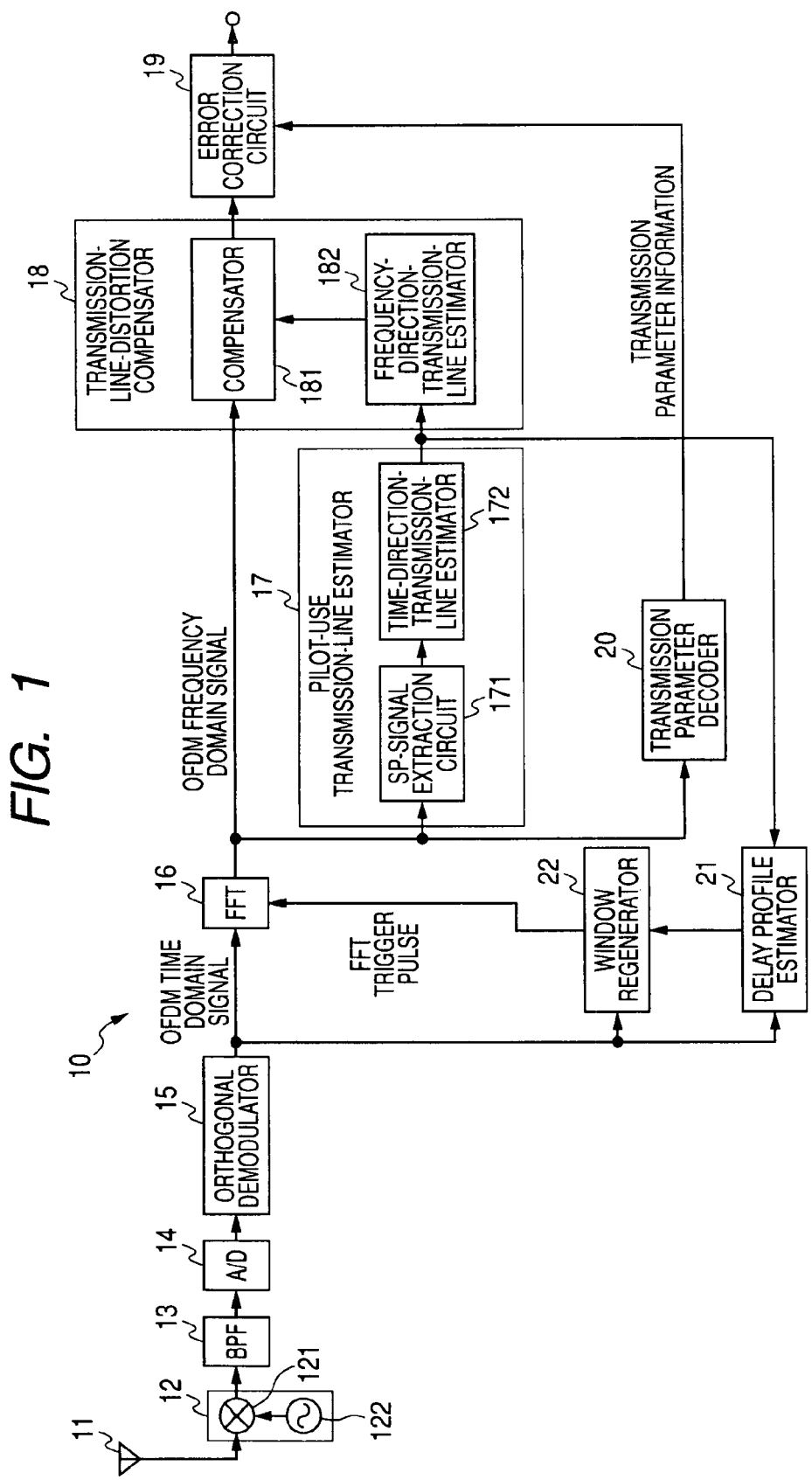
FIG. 1 is a block diagram showing a structure of an OFDM receiver according to an embodiment of the present invention.

The present invention is applied to, for example, an OFDM receiver 10 having a structure shown in FIG. 1.

The OFDM receiver 10 includes an antenna 11, a tuner 12, a band-pass filter (BPF) 13, an A/D converter 14, a digital orthogonal demodulator 15, an FFT arithmetic circuit 16, a pilot-use channel estimator 17, a channel distortion compensator 18, an error correction circuit 19, a transmission parameter decoder 20, a delay profile estimator 21, and a window regenerator 22.

A broadcast wave of a digital broadcast transmitted from a broadcasting station is received by the antenna 11 of the OFDM receiver 10 and supplied to the tuner 12 as an RF signal.

The tuner 12 includes a multiplication circuit 121 and a local oscillator 122. The tuner 12 frequency-converts the RF signal received by the antenna 11 into an IF signal. The IF signal obtained by the tuner 12 is filtered by the band-pass filter (BPF) 13 and, then, digitized by the A/D converter 14 and supplied to the digital orthogonal demodulator 15.

The digital orthogonal demodulator 15 orthogonally demodulates the digitized IF signal using a carrier signal of a predetermined frequency (a carrier frequency) and outputs an OFDM signal of a baseband. The OFDM signal of the baseband outputted from the digital orthogonal demodulator 15 is a signal in a so-called time domain before being subjected to an FFT operation. Therefore, a baseband signal after digital orthogonal demodulation and before the FFT operation is hereinafter referred to as an OFDM time domain signal. As a result of orthogonal demodulation, this OFDM time domain signal changes to a complex signal including a real axis component (an I channel signal) and an imaginary axis component (a Q channel signal). The OFDM time domain signal outputted by the digital orthogonal demodulator 15 is supplied to the FFT arithmetic circuit 16, the window regenerator 22, and the delay profile estimator 21.

The FFT arithmetic circuit 16 applies the FFT operation to the OFDM time domain signal, extracts data orthogonally modulated in each of sub-carriers, and outputs the data. The signal outputted from the FFT arithmetic circuit 16 is a signal in a so-called frequency domain after being subjected to the FFT operation. Therefore, the signal after the FFT operation is referred to as an OFDM frequency domain signal.

Figure 2:
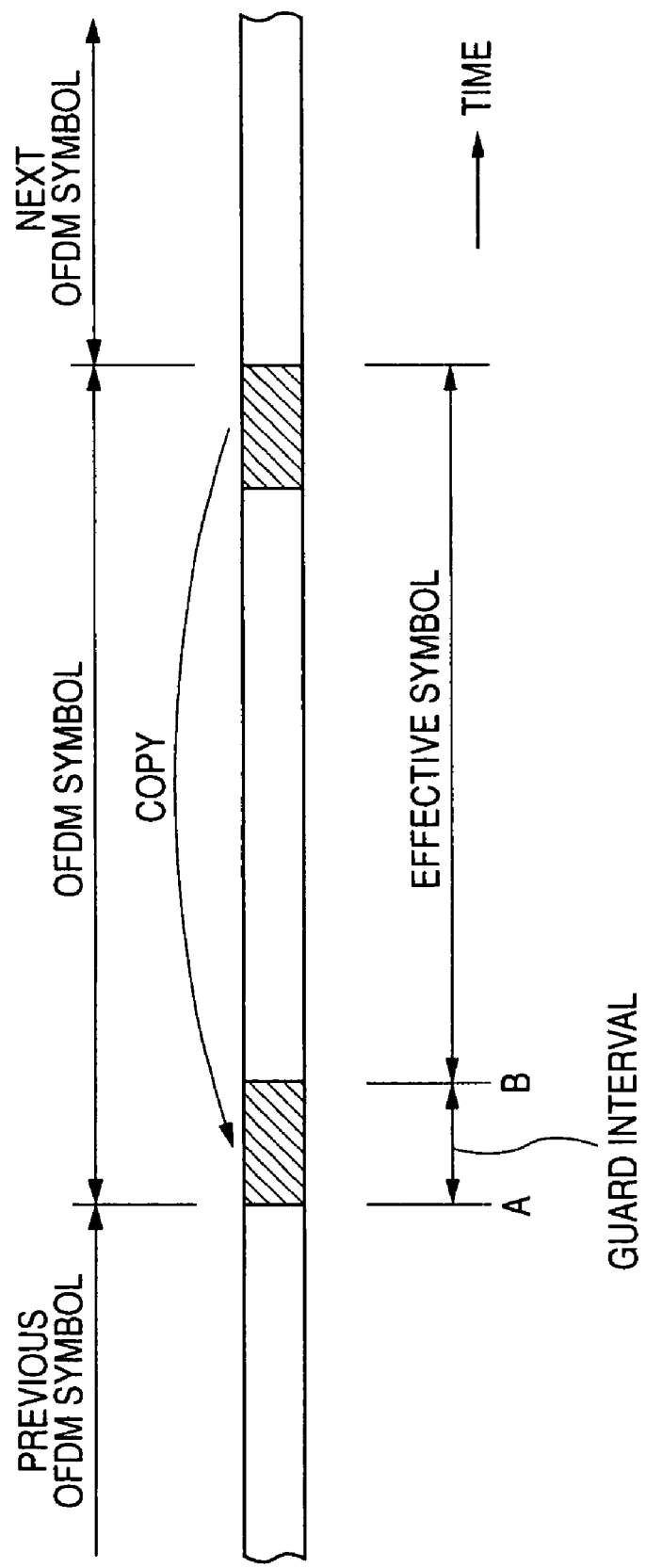
FIG. 2 is a diagram for explaining transmission symbols of an OFDM signal.

The FFT arithmetic circuit 16 extracts a signal in a range of an effective symbol length from one OFDM symbol, i.e., excludes a range of a guard interval from one OFDM symbol, and applies the FFT operation to the extracted OFDM time domain signal. Specifically, as shown in FIG. 2, a position where the arithmetic operation is started is any position from a boundary of the OFDM symbol (a position of A in FIG. 2) to an end position of the guard interval (a position of B in FIG. 2). This arithmetic operation range is referred to as an FFT window.

A transmission signal in the OFDM system is transmitted by a unit of a symbol called an OFDM symbol. This OFDM symbol includes an effective symbol that is a signal period in which IFFT is performed during transmission and a guard interval in which a waveform of a part of the latter half of this effective symbol is directly copied. This guard interval is provided in the former half of the OFDM symbol. In the OFDM system, such a guard interval is provided to improve multi-path resistance. Plural OFDM symbols are collected to form one OFDM transmission frame. For example, in the ISDB-T standard, ten FDM transmission frames are formed by two hundred four OFDM symbols. Insertion positions of pilot signals are set with this unit of OFDM transmission frames as a reference.

In the OFDM system in which the modulation of a QAM system is used as a modulation system for each of the sub-carriers, characteristics of the amplitude and the phase are different for each of the sub-carriers because of the influence of the multi-path and the like during transmission. Therefore, on a reception side, it is necessary to equalize a reception signal to make the amplitude and the phase for each of the sub-carriers equal. In the OFDM system, on a transmission side, pilot signals of a predetermined amplitude and a predetermined phase are discretely inserted in a transmission symbol in a transmission signal. On the reception side, a frequency characteristic of a channel is calculated using the amplitude and the phase of the pilot signals and a reception signal is equalized according to the calculated characteristic of the channel.

Figure 3:
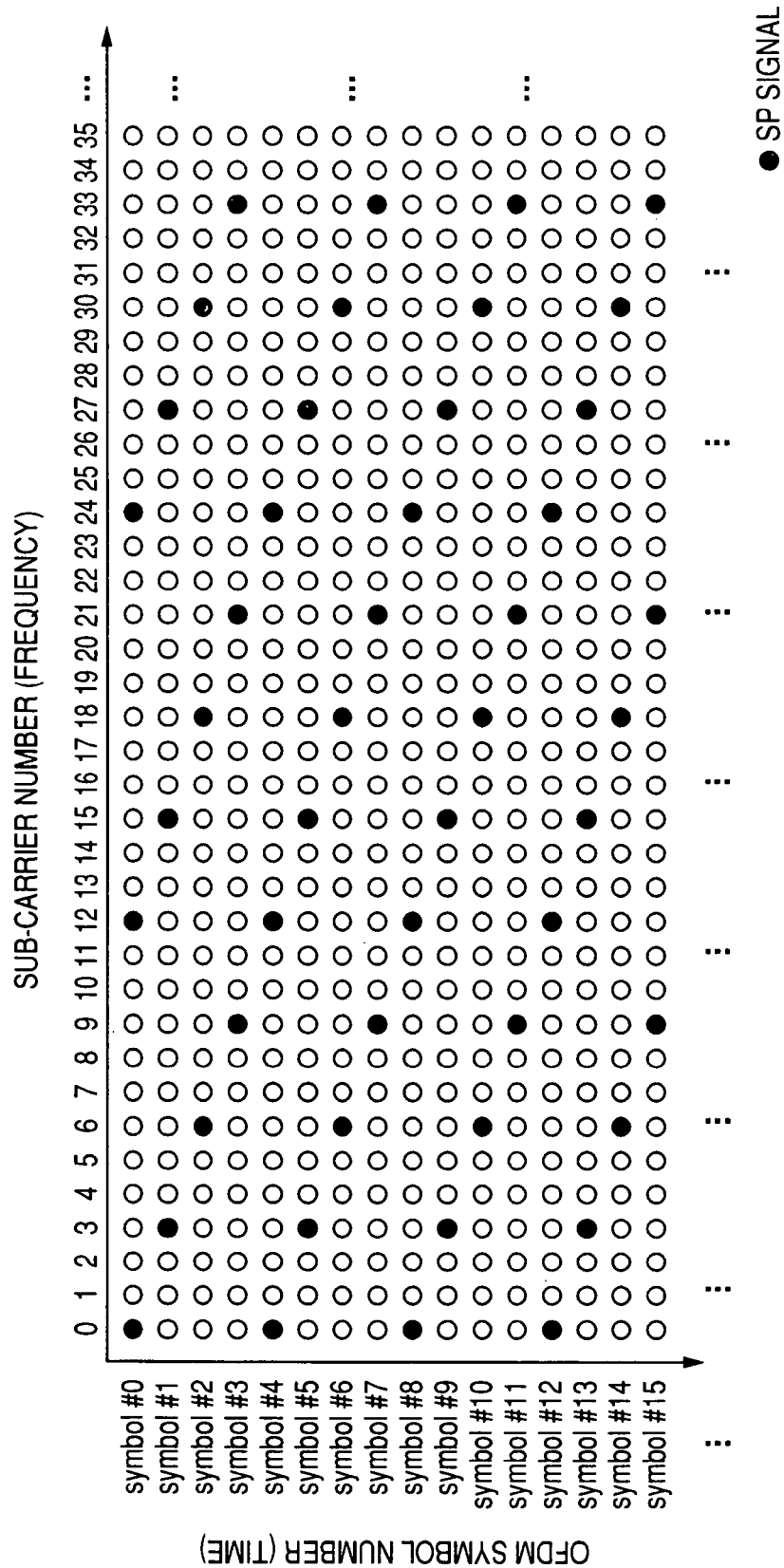
FIG. 3 is a diagram for explaining an arrangement pattern of SP signals in the OFDM signal.

The pilot signals used for calculating a channel characteristic are referred to as scattered pilot (SP) signals. An arrangement pattern in the OFDM symbol of the SP signals adopted in the DVB-T standard and the ISDB-T standard is shown in FIG. 3.

In the OFDM receiver 10, the designation of this FFT window position is performed by the window regenerator 22. As the window regenerator 22, for example, means for performing window regeneration according to detection of a correlation value of a guard interval period using the OFDM time domain signal and means for estimating a delay profile of a channel using the delay profile estimator 21 and performing window regeneration are used.

The pilot-use channel estimator 17 extracts the SP signals inserted in the OFDM frequency domain signal calculated by the FFT arithmetic circuit 16 and estimates a channel characteristic of the sub-carriers in which the SP signals are arranged.

Figure 4:
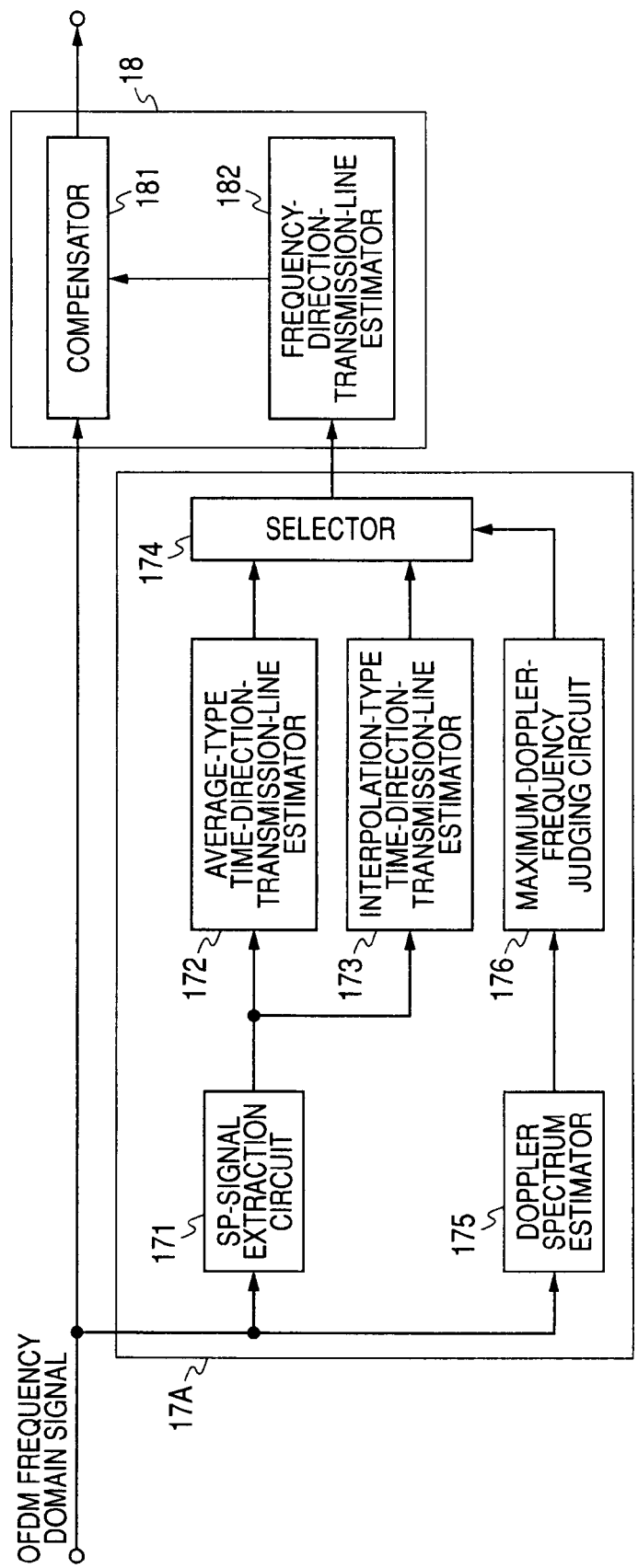
FIG. 4 is a block diagram showing a structure of a pilot-use channel estimator in the OFDM receiver.

The pilot-use channel estimator 17 in the OFDM receiver 10 includes, for example, as in a pilot-use channel estimator 17A shown in FIG. 4, an SP-signal extraction circuit 171, an average-type time-direction-channel estimator 172, an interpolation-type time-direction-channel estimator 173, a selector 174, a Doppler spectrum estimator 175, and a maximum-Doppler-frequency judging circuit 176.

In the pilot-use channel estimator 17A, the OFDM frequency domain signal is supplied to the SP-signal extraction circuit 171 and the Doppler spectrum estimator 175.

The SP-signal extraction circuit 171 extracts only SP signals inserted in positions shown in FIG. 3 and removes modulation components of the pilot signals to calculate channel characteristics in the SP positions. Channel characteristics in the SP positions calculated by the SP-signal extraction circuit 171 are supplied to the average-type time-direction-channel estimator 172 and the interpolation-type time-direction-channel estimator 173.

Figure 5A:
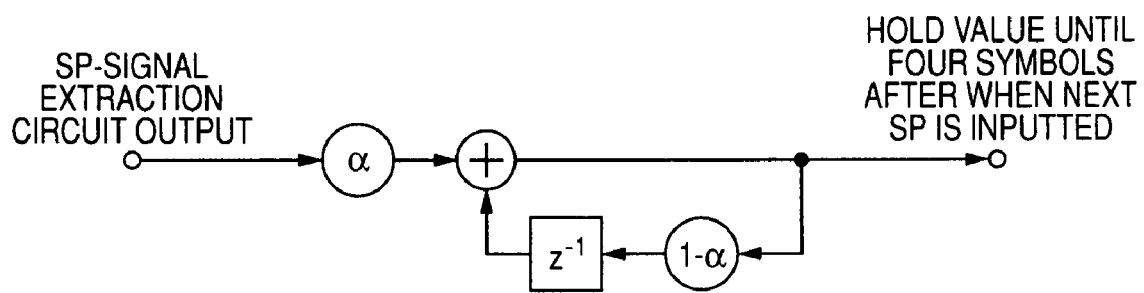
FIGS. 5A and 5B are diagrams for explaining an average-type method of estimating a time direction channel in the pilot-use channel estimator.
Figure 5B:
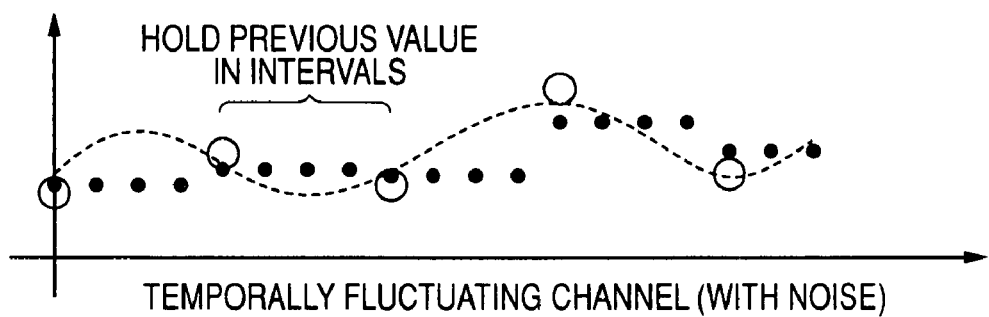

The average-type time-direction-channel estimator 172 includes a primary IIR filter having a structure, for example, shown in FIG. 5A. The average-type time-direction-channel estimator 172 averages channel estimated values in the SP positions estimated by the SP-signal extraction circuit 171 as shown in FIG. 5B. An IIR output is repeatedly used during the SP signals adjacent to one another in the time direction.

Figure 6A:
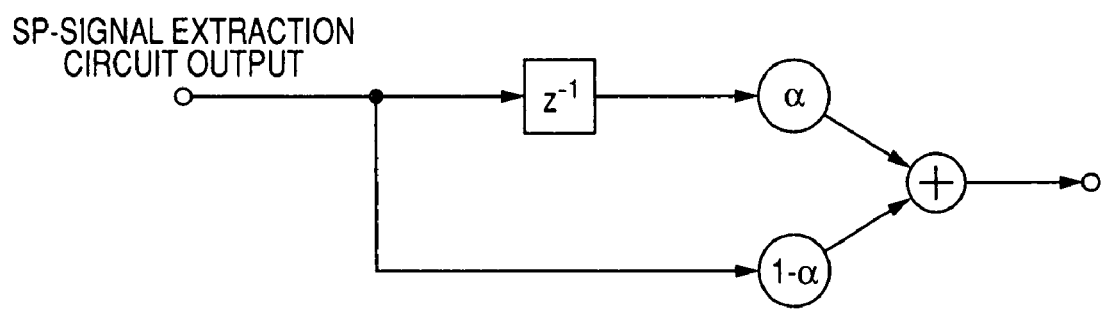
FIGS. 6A and 6B are diagrams for explaining an interpolation-type method of estimating a time direction channel in the pilot-use channel estimator.
Figure 6B:
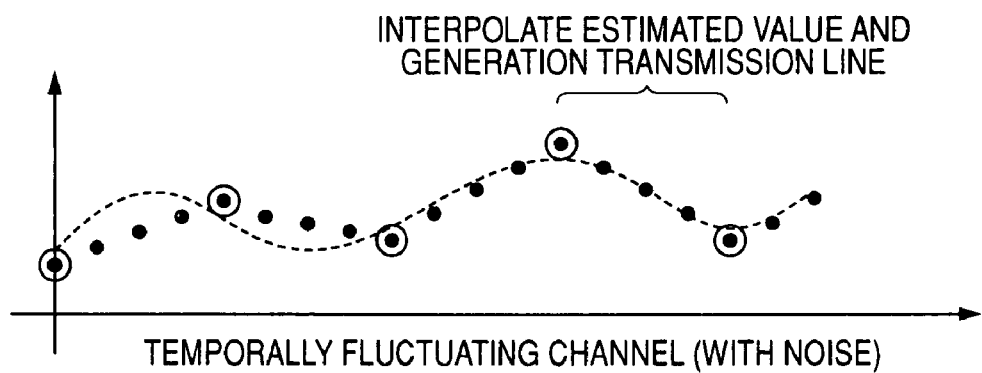

The interpolation-type time-direction-channel estimator 173 includes a linear interpolation circuit having a structure, for example, shown in FIG. 6A. The interpolation-type time-direction-channel estimator 173 interpolates the channel estimated values in the SP signal positions, which are estimated by the SP-signal extraction circuit 171, in the time direction to estimate a channel during three symbols as shown in FIG. 6B.

The Doppler spectrum estimator 175 estimates a Doppler spectrum from the OFDM frequency domain signal. The maximum-Doppler-frequency judging circuit 176 calculates a maximum Doppler frequency from the Doppler spectrum estimated by the Doppler spectrum estimator 175.

Figure 7A:
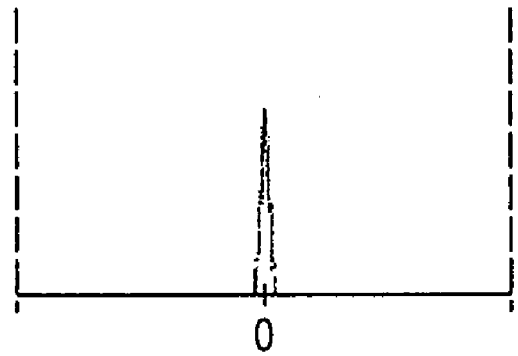
FIGS. 7A to 7C are diagrams schematically showing an example of a Doppler spectrum.
Figure 7B:
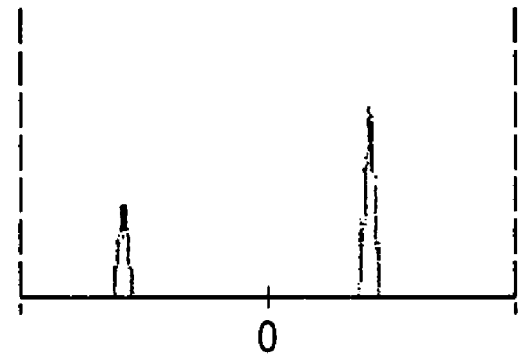
Figure 7C:
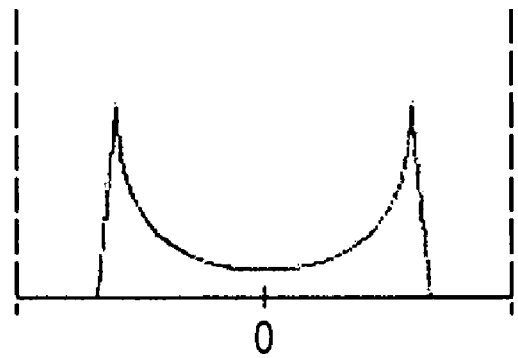

A Doppler spectrum corresponding to fluctuation in a channel is shown in FIGS. 7A to 7C. When there is no fluctuation or fluctuation is extremely gentle, as shown in FIG. 7A, a spectrum is a linear spectrum centered in 0 [Hz]. When fluctuation is periodic, since the fluctuation can be approximated by adding up several sine waves, the Doppler spectrum can be represented by several linear spectra. A state of the Doppler spectrum represented by two linear spectra is shown in FIG. 7B. When fluctuation is random, a spectrum has a spread and, as shown in FIG. 7C, shows a well-known well-type spectrum.

The pilot-use channel estimator 17A in the OFDM receiver 10 calculates the Doppler spectrum shown in FIGS. 7A to 7C from the OFDM frequency domain signal and selects an optimum method of estimating a time direction channel from a shape of the spectrum and a maximum Doppler frequency to perform the estimation of a time direction channel corresponding to the fluctuation in the channel.

The selector 174 switches outputs of the average-type time-direction-channel estimator 172 and the interpolation-type time-direction-channel estimator 173 according to the maximum Doppler frequency outputted from the maximum-Doppler-frequency judging circuit 176. When the maximum Doppler frequency is extremely small, the selector 174 selects the average-type time-direction-channel estimator 172 that executes average-type estimation of a time direction channel. When there is fluctuation, the selector 174 selects the interpolation-type time-direction-channel estimator 173 that executes interpolation-type estimation of a time direction channel. Consequently, in both a case in which temporal fluctuation in the channel is slow and a case in which temporal fluctuation in the channel is fast, it is possible to perform high-performance channel estimation and, as shown in FIG.

8, estimate channel characteristics for every three sub-carriers in the frequency direction for all OFDM symbols.

The channel distortion compensator 18 includes a compensator 181 and a frequency-direction-channel estimator 182.

Figure 9:
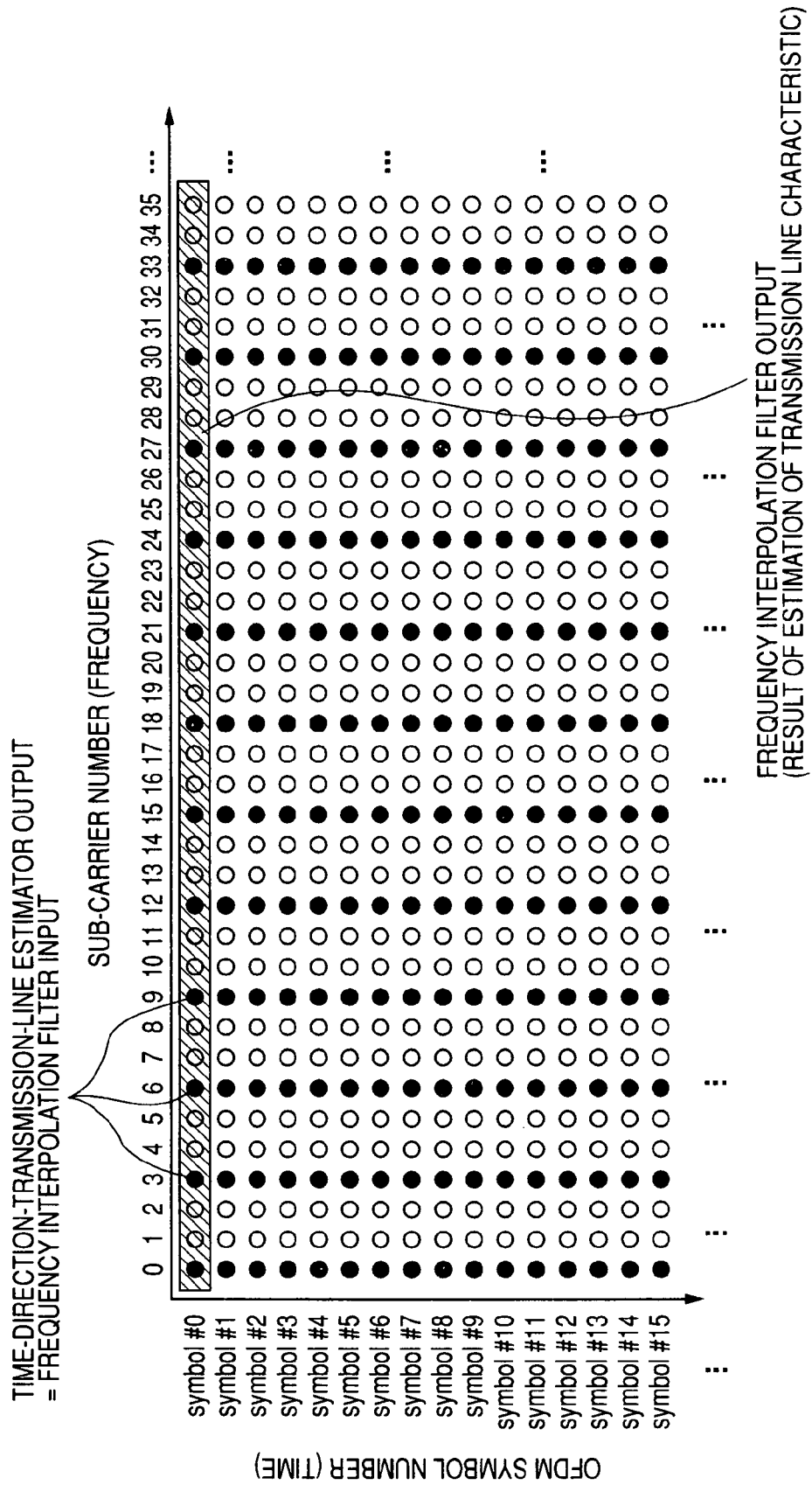
FIG. 9 is a diagram for explaining sub-carriers estimated by a frequency-direction channel estimator in the OFDM receiver.

In the channel distortion compensator 18, the frequency-direction-channel estimator 182 subjects the channel characteristics calculated for every three sub-carriers by the pilot-use channel estimator 17A to processing in the frequency direction to calculate channel characteristics of all the sub-carriers in the OFDM symbol as shown in FIG. 9. As a result, it is possible to estimate channel characteristics for all the sub-carriers of the OFDM signal. The compensator 181 removes distortion due to the channel from the OFDM frequency domain signal calculated by the FFT arithmetic circuit 16 using the channel characteristics of all the sub-carriers supplied from the frequency-direction-channel estimator 182.

The transmission parameter decoder 20 extracts transmission parameter information from the OFDM frequency domain signal by decoding a sub-carrier in which the transmission parameter information is inserted and supplies the transmission parameter information to the error correction circuit 19.

The error correction circuit 19 applies, in accordance with the transmission parameter information supplied from the transmission parameter decoder 20, de-interleave processing to the OFDM frequency domain signal, from which the channel distortion is removed by the channel-distortion compensator 18. The error correction circuit 19 outputs the OFDM frequency domain signal as decoded data through depuncture, Viterbi, diffused signal removal, and RS decoding.

The delay profile estimator 21 calculates an impulse response of the channel and supplies the impulse response to the window regenerator 22. As a method of delay profile estimation, for example, a method of using a matched filter that sets a guard interval period as a tap coefficient using the OFDM time domain signal and a method of calculating a delay profile by subjecting a channel characteristic supplied from the pilot-use channel estimator 17 to IFFT are adopted.

Figure 10:
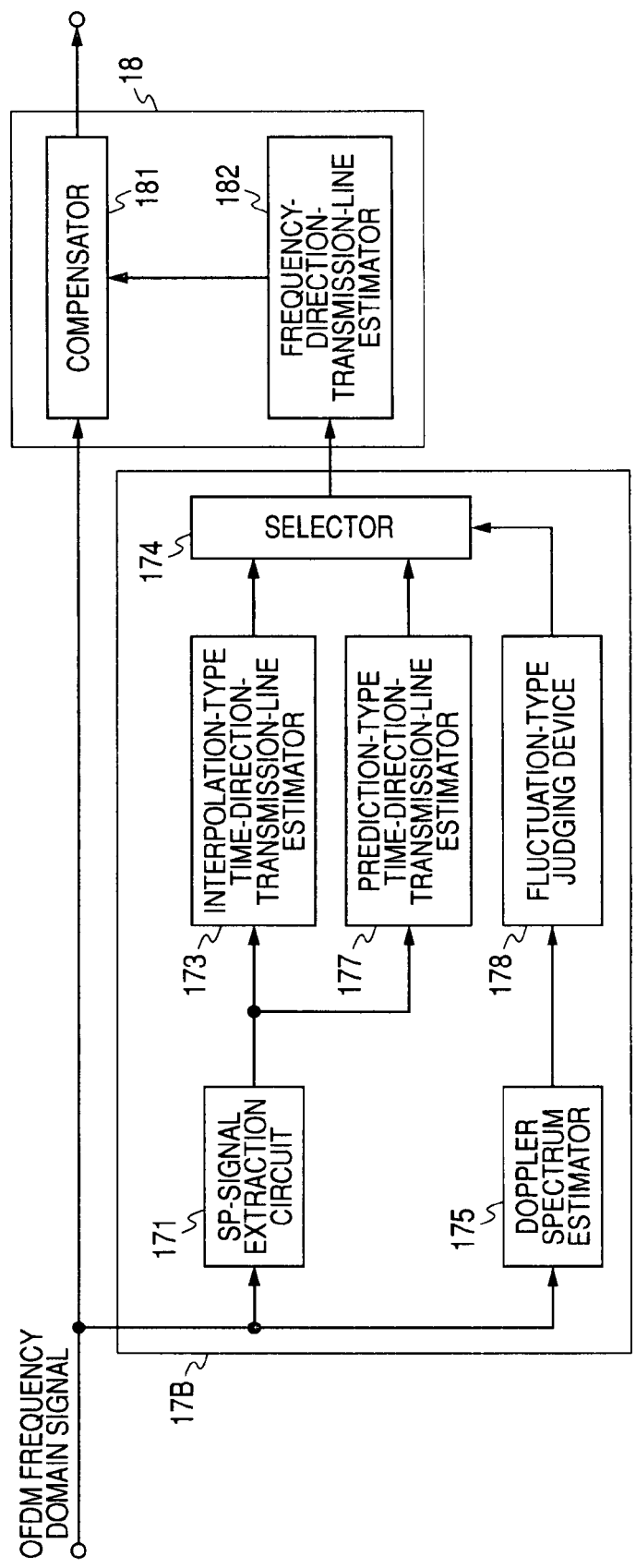
FIG. 10 is a block diagram showing an example of another structure of the pilot-use channel estimator in the OFDM receiver.
Figure 12:
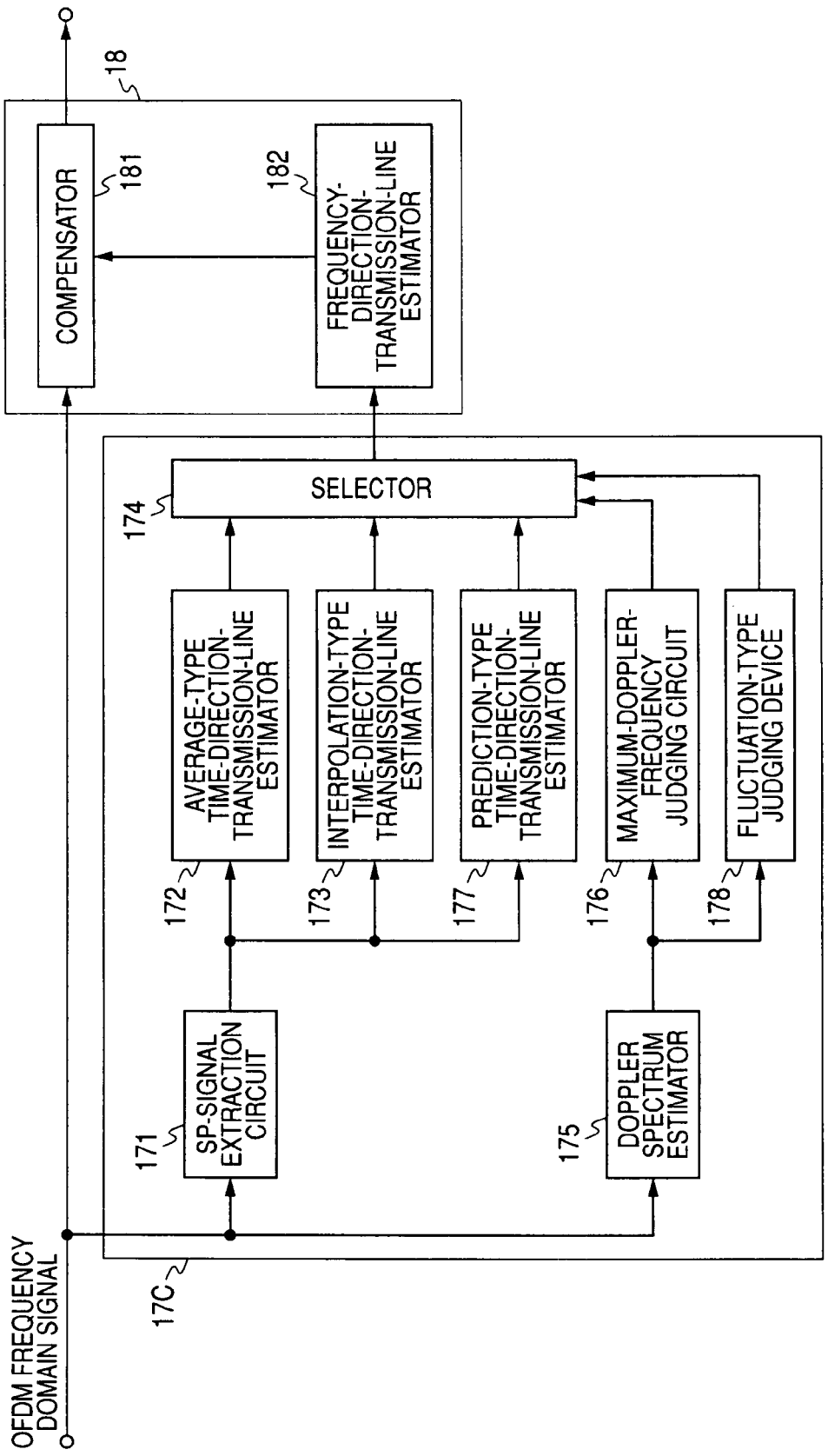
FIG. 12 is a block diagram showing an example of still another structure of the pilot-use channel estimator in the OFDM receiver.

As the pilot-use channel estimator 17, instead of the pilot-use channel estimator 17A in which the average-type time-direction-channel estimator 172 and the interpolation-type time-direction-channel estimator 173 are switched by the selector 174, a pilot-use channel estimator 17B having a structure shown in FIG. 10 or a pilot-use channel estimator 17C having a structure shown in FIG. 12 may be adopted.

The pilot-use channel estimator 17B shown in FIG. 10 includes the SP-signal extraction circuit 171, the interpolation-type time-direction-channel estimator 173, a prediction-type time-direction-channel estimator 177, the selector 174, the Doppler spectrum estimator 175, and a fluctuation-type judging device 178.

In the pilot-use channel estimator 17B, an OFDM frequency domain signal is supplied to the SP-signal extraction circuit 171 and the Doppler spectrum estimator 175. The SP-signal extraction circuit 171 extracts only the SP signals inserted in the positions shown in FIG. 3 and removes modulation components of the pilot signals to calculate channel characteristics in the SP positions. The channel characteristics in the SP positions calculated by the SP-signal extraction circuit 171 are supplied to the interpolation-type time-direction-channel estimator 173 and the prediction-type time-direction-channel estimator 177.

The interpolation-type time-direction-channel estimator 173 includes a variable-coefficient FIR filter having the structure shown in FIG. 6A. The interpolation-type time-direction-channel estimator 173 interpolates a channel estimated value in an SP position, which is estimated by the SP-signal extraction circuit 171, in the time direction to estimate a channel during three symbols as shown in FIG. 6B.

Figure 11A:
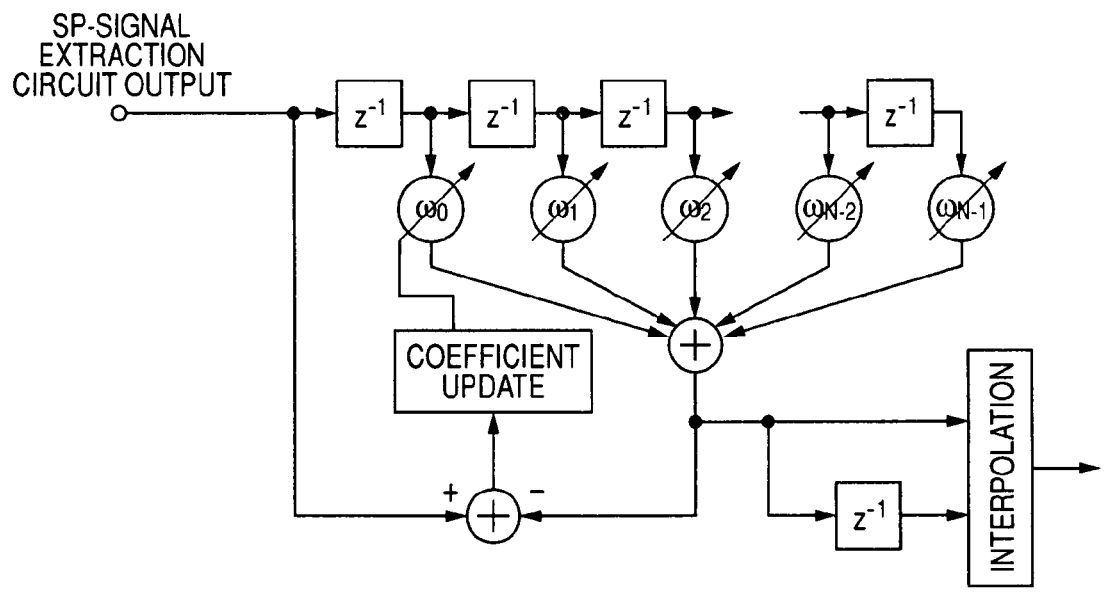
FIGS. 11A and 11B are diagrams for explaining a prediction-type method of estimating a time direction channel in the pilot-use channel estimator.
Figure 11B:
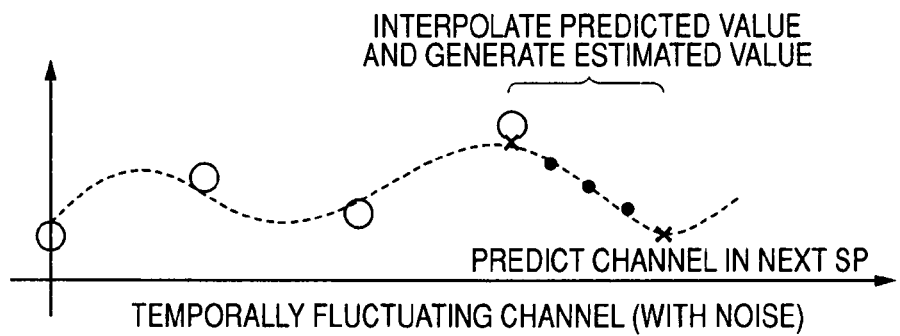

The prediction-type time-direction-channel estimator 177 includes a primary IIR filter having a structure, for example, shown in FIG. 11A. As shown in FIG. 11B, the prediction-type time-direction-channel estimator 177 predicts a channel in the next SP position with the channel estimated value in the SP position estimated by the SP-signal extraction circuit 171 as an input. Until the next SP signal is inputted, the prediction-type time-direction-channel estimator 177 interpolates a predicted value to generate an estimated value. As a method of updating a coefficient of the filter, there is a method of using a least mean square (LMS) algorithm or the like.

The Doppler spectrum estimator 175 estimates a Doppler spectrum from the OFDM frequency domain signal. The fluctuation-type judging device 178 judges a shape of the Doppler spectrum estimated by the Doppler spectrum estimator 175.

Figure 8:
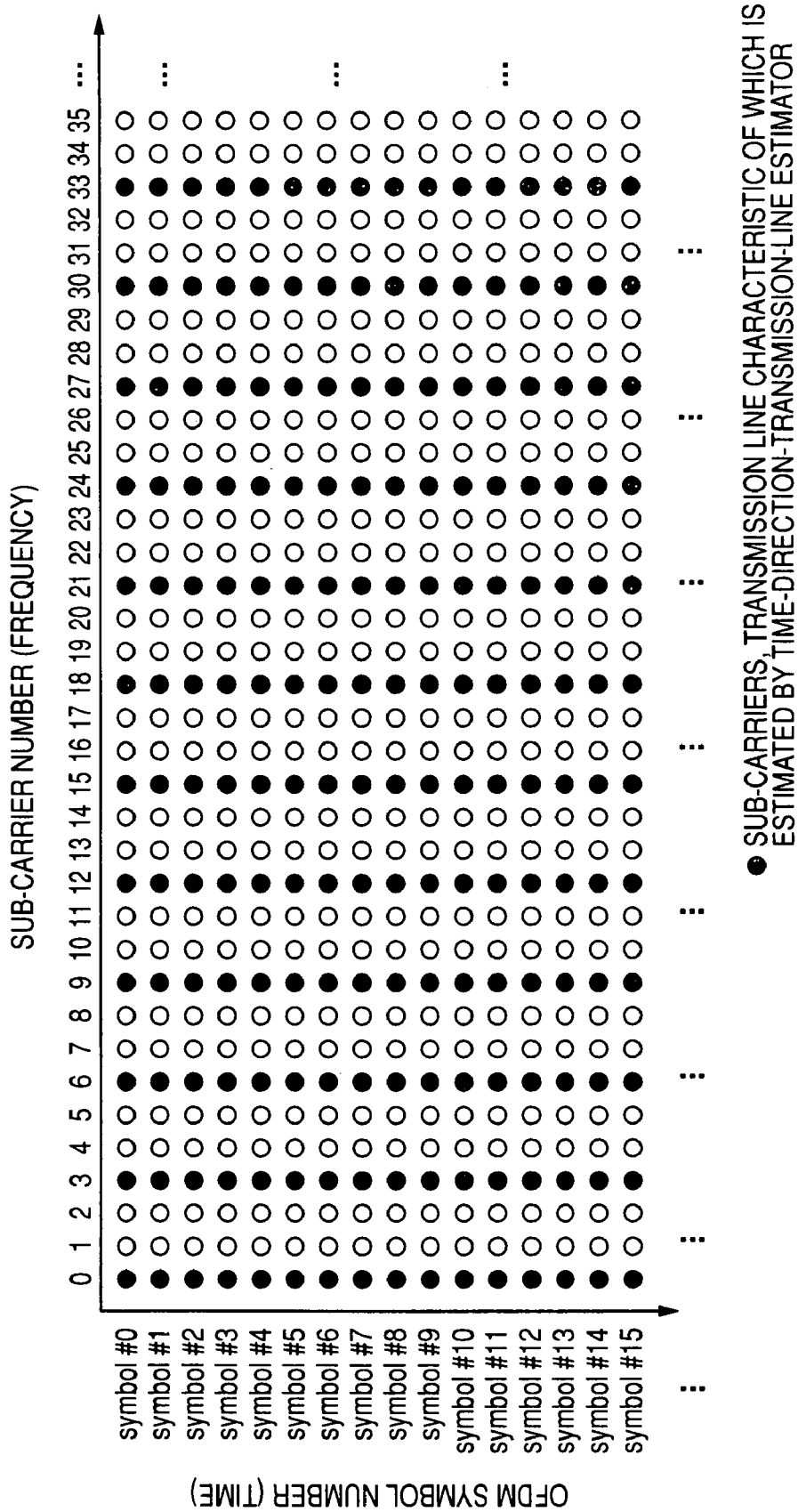
FIG. 8 is a diagram for explaining sub-carries estimated by the estimation of a time direction channel in the pilot-use channel estimator.

The selector 174 switches outputs of the interpolation-type time-direction-channel estimator 173 and the prediction-type time-direction-channel estimator 177 according to an output of the judgment by the fluctuation-type judging device 178. When fluctuation in a channel is a linear spectrum, the selector 174 selects the prediction-type time-direction-channel estimator 177 that executes prediction-type estimation of a time direction channel. When fluctuation is random, i.e., when a spectrum has a spread, the selector 174 selects the interpolation-type time-direction-channel estimator 173 that executes interpolation-type estimation of a time direction channel. Consequently, in both a case in which temporal fluctuation in the channel is periodic (including a case in which there is no fluctuation) and a case in which the channel fluctuates at random, it is possible to perform high-performance channel estimation and, as shown in FIG. 8, estimate channel characteristics for every three sub-carriers in the frequency direction for all OFDM symbols.

The pilot-use channel estimator 17C shown in FIG. 12 includes the SP-signal extraction circuit 171, the average-type time-direction-channel estimator 172, the interpolation-type time-direction-channel estimator 173, the prediction-type time-direction-channel estimator 177, the selector 174, the Doppler spectrum estimator 175, the maximum-Doppler-frequency judging circuit 176, and the fluctuation-type judging device 178.

The pilot-use channel estimator 17C is obtained by combining the pilot-use channel estimator 17A shown in FIG. 4 and the pilot-use channel estimator 17B shown in FIG. 10. In the pilot-use channel estimator 17C, the Doppler spectrum estimator 175 estimates a Doppler spectrum from the OFDM frequency domain signal. The maximum-Doppler-frequency judging circuit 176 calculates a maximum Doppler frequency. When this maximum Doppler frequency is small, the average-type method of estimating a time direction channel is selected. When fluctuation is large, the fluctuation-type judging device 178 judges whether the fluctuation is periodic fluctuation or random fluctuation. When the fluctuation is periodic fluctuation, the prediction-type method of estimating a time direction channel is selected. When the fluctuation is random fluctuation, the interpolation-type method of estimating a time direction channel is selected. This makes it possible to select an appropriate estimation method according to presence or absence of fluctuation in the channel and a type of the fluctuation and perform high-performance channel estimation.

Figure 13:
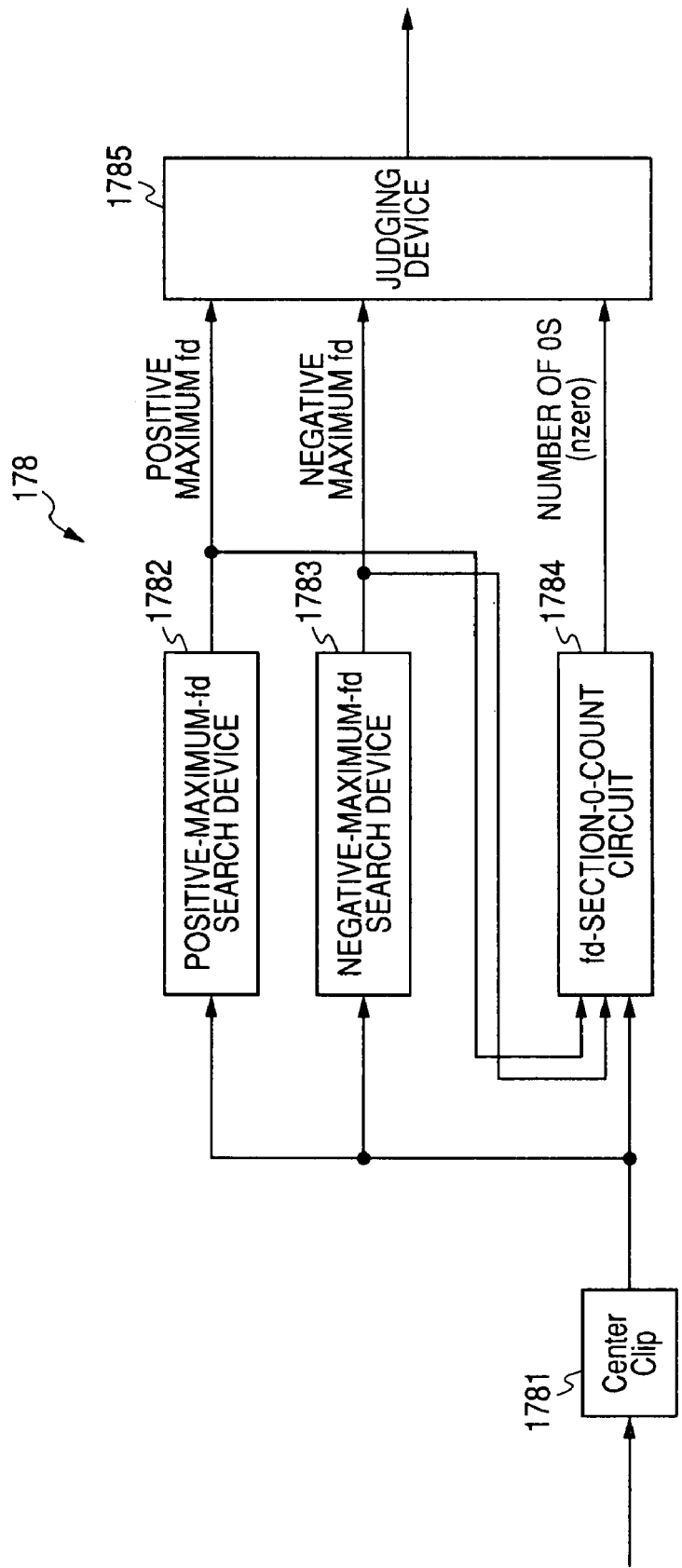
FIG. 13 is a block diagram showing an example of a structure of a fluctuation-type judging device in the pilot-use channel estimator.

The fluctuation-type judging device 178 includes, for example, as shown in FIG. 13, a center clip circuit 1781, a positive-maximum-Doppler search device 1782, a negative-maximum-Doppler search device 1783, an fd-section-0-count circuit 1784, and a judging device 1785.

In the fluctuation-type judging device 178, first, in order to remove noise components, the center clip circuit 1781 applies center clip processing to a spectrum. The center clip circuit 1781 subtracts a threshold from the spectrum and forcibly replaces a negative portion with 0 to perform the center clip processing. The spectrum subjected to the center clip processing is supplied to the positive-maximum-Doppler search device 1782, the negative-maximum-Doppler search device 1783, and the fd-section-0-count circuit 1784. The positive-maximum-Doppler-search device 1782 searches for a maximum positive index of a non-zero value. The negative-maximum-Doppler search device 1783 searches for a negative maximum index of a non-zero value. The fd-section-0-count circuit 1784 counts an index of 0 between the positive maximum Doppler index and the negative maximum Doppler index.

Figure 14:
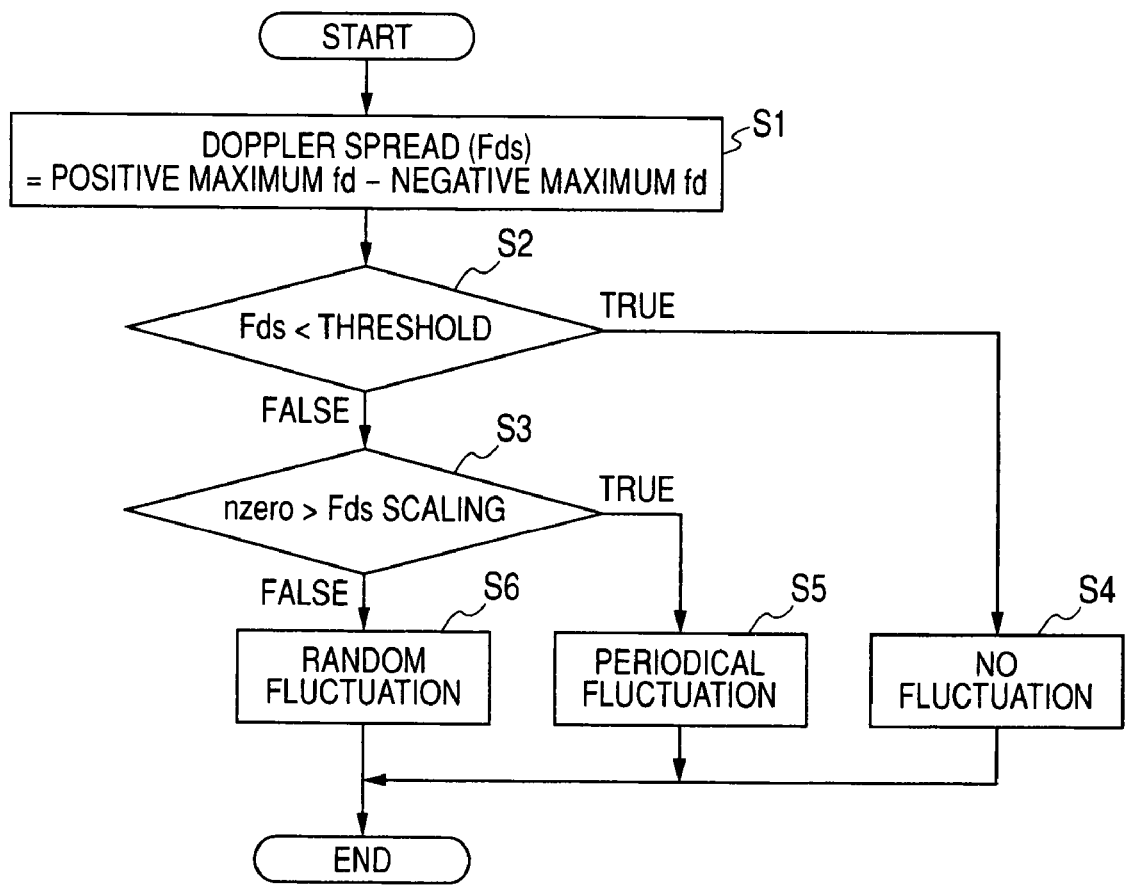
FIG. 14 is a flowchart showing operations of a judging device in the fluctuation-type judging device.

The judging device 1785 judges a shape of the spectrum in accordance with a procedure shown in a flowchart in FIG. 14.

First, the judging device 1785 subtracts the negative maximum index from the positive maximum index to calculate a Doppler spread (hereinafter referred to as "Fds") (step S1).

The judging device 1785 judges whether the Doppler spread (Fds) calculated in step S1 is smaller than the threshold (step S2).

When a result of the judgment in step S2 is TRUE, i.e., the Fds is smaller than the threshold, the judging device 1785 judges that a channel is a channel without fluctuation (step S4) and finishes the processing for judging a shape of the spectrum.

Figure 15A:
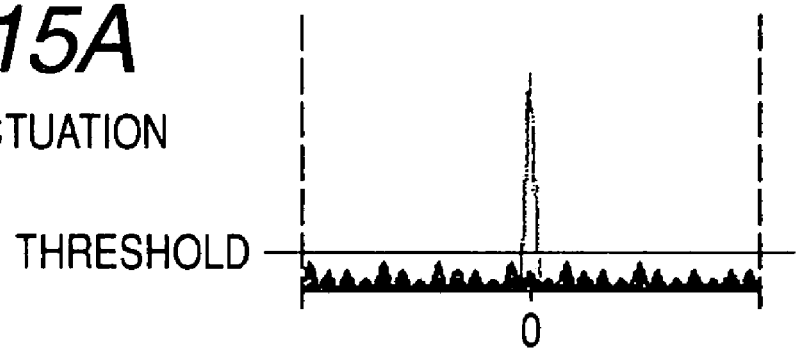
FIGS. 15A to 15C are diagrams schematically showing a state of judgment of a shape of a Doppler spectrum at the time when there is no fluctuation.
Figure 15B:
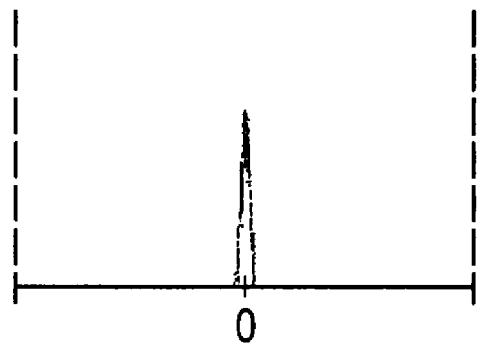
Figure 15C:
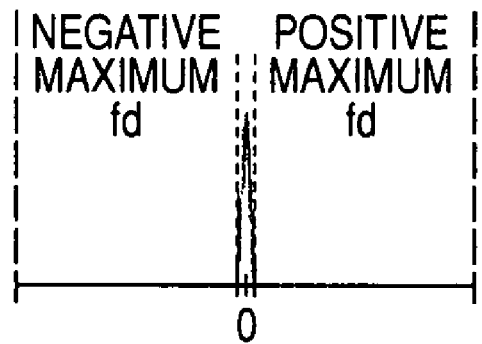

A state of the judgment of a shape of a Doppler spectrum at the time when there is no fluctuation is shown in FIGS. 15A to 15C.

The center clip circuit 1781 applies, as shown in FIG. 15A, the center clip processing to the Doppler spectrum calculated by the Doppler spectrum estimator 175 to obtain a Doppler spectrum from which noise is removed as shown in FIG. 15B. As shown in FIG. 15C, when a Doppler spread (Fds) of the Doppler spectrum is smaller than the threshold, the judging device 1785 judges that the channel is a channel without fluctuation.

When a result of the judgment in step S2 is FALSE, i.e., the Fds is equal to or larger than the threshold, the judging device 1785 judges whether fluctuation is periodic fluctuation or random fluctuation (step S3).

The judgment processing in step S3 can be performed on the basis of a ratio of a section of 0 in the Doppler spread. When the number of 0s (hereinafter referred to as nzero) supplied from the fd-section-0-count circuit 1784 is larger than Fds* scaling (e.g., 0.9) (step S3: TRUE), the judging device 1785 regards the fluctuation as periodic fluctuation (step S5). When the number of 0s is not larger than Fds* scaling (step S3: FALSE), the judging device 1785 regards the fluctuation as random fluctuation (step S6) and finishes the processing for judging a shape of the spectrum.

Figure 16A:
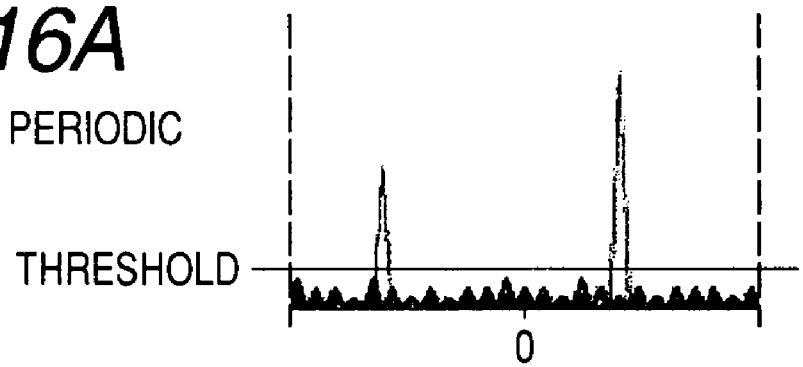
FIGS. 16A to 16C are diagrams schematically showing a state of judgment of a shape of a Doppler spectrum at the time when fluctuation is periodic.
Figure 16B:
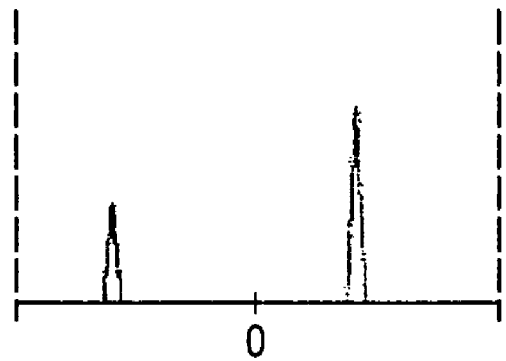
Figure 16C:
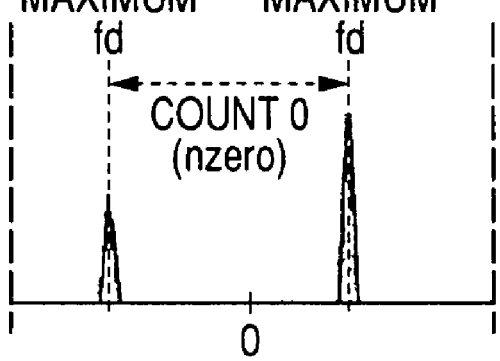

A state of the judgment of a shape of a Doppler spectrum at the time when fluctuation is periodic is shown in FIGS. 16A to 16C.

The center clip circuit 1781 applies, as shown in FIG. 16A, the center clip processing to the Doppler spectrum calculated by the Doppler spectrum estimator 175 to obtain a Doppler spectrum from which noise is removed as shown in FIG. 16B. As shown in FIG. 16C, when the number of indexes of 0 between the positive maximum Doppler index and the negative maximum Doppler index is larger than Fds* scaling, the judging device 1785 judges that the channel is a channel that fluctuates periodically.

Figure 17A:
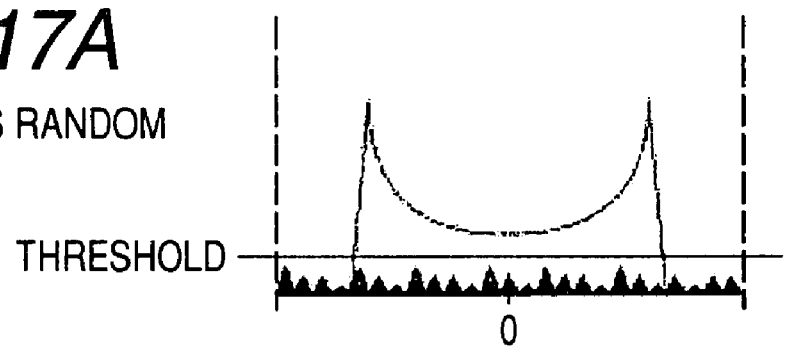
FIGS. 17A to 17C are diagrams schematically showing a state of judgment of a shape of a Doppler spectrum at the time when fluctuation is random.
Figure 17B:
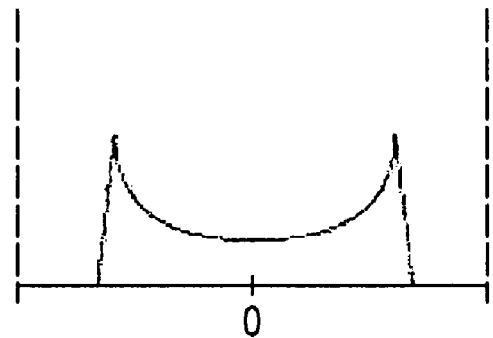
Figure 17C:
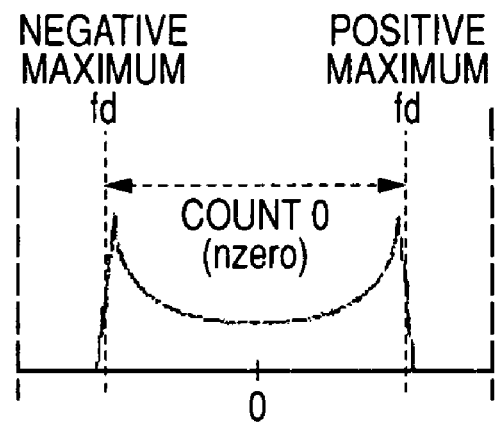

A state of the judgment of a shape of a Doppler spectrum at the time when fluctuation is random is shown in FIGS. 17A to 17C.

The center clip circuit 1781 applies, as shown in FIG. 17A, the center clip processing to the Doppler spectrum calculated by the Doppler spectrum estimator 175 to obtain a Doppler spectrum from which noise is removed as shown in FIG. 17B. As shown in FIG. 17C, when the number of indexes of 0 between the positive maximum Doppler index and the negative maximum Doppler index is equal to or smaller than Fds* scaling, the judging device 1785 judges that the channel is a channel that fluctuates at random.

In the OFDM receiver 10 according to this embodiment, according to an output of the fluctuation-type judging device 178, the selector 174 selects the average-type time-direction-channel estimator 172 when a channel is static, selects the prediction-type time-direction-channel estimator 177 in the case of periodic temporal fluctuation, and selects the interpolation-type time-direction-channel estimator 173 in the case of random temporal fluctuation.

As described above, the selector 174 selectively switch, according to an output of the fluctuation-type judging device 178, any one of the average-type time-direction-channel estimator 172, the prediction-type time-direction-channel estimator 177, and the interpolation-type time-direction-channel estimator 173. Thus, it is possible to select an appropriate estimation method according to a state of a channel without increasing sizes of the circuits and attain excellent reception performance in all channels.

It should be understood by those skilled in the art that various modifications, combinations, sub-combinations, and alterations may occur depending on design requirements and other factors insofar as they are within the scope of the appended claims or the equivalents thereof.

The invention claimed is:

1. An OFDM receiver comprising:
    OFDM-signal receiving means for receiving an orthogonal frequency division multiplexing (OFDM) signal;
    channel-characteristic estimating means for estimating a channel characteristic using pilot signals in the OFDM signal received by the OFDM-signal receiving means; and
    transmission-distortion compensating means for applying, on the basis of the channel characteristic estimated by the channel-characteristic estimating means, processing for compensating for transmission distortion to the OFDM signal received by the OFDM-signal receiving means, wherein the channel-characteristic estimating means includes:
    plural kinds of time-direction-channel estimating means used for the estimation of a channel characteristic; and
    switching control means for switching these estimating means according to a state of a channel,
    in which the switching control means includes maximum-Doppler-frequency judging means for calculating a maximum Doppler frequency from an estimated Doppler spectrum for the OFDM signal, and
    in which the switching control means controls the switching of the plural kinds of time-direction-channel estimating means according to the maximum Doppler frequency.

2. An OFDM receiver according to claim 1, wherein the switching control means includes Doppler-spectrum estimating means for estimating the Doppler spectrum for the OFDM signal received by the OFDM-signal receiving means.

3. An OFDM receiver comprising:
OFDM-signal receiving means for receiving an orthogonal frequency division multiplexing (OFDM) signal;
channel-characteristic estimating means for estimating a channel characteristic using pilot signals in the OFDM signal received by the OFDM-signal receiving means; and
transmission-distortion compensating means for applying, on the basis of the channel characteristic estimated by the channel-characteristic estimating means, processing for compensating for transmission distortion to the OFDM signal received by the OFDM-signal receiving means,
wherein the channel-characteristic estimating means includes:
plural kinds of time-direction-channel estimating means used for the estimation of a channel characteristic; and
switching control means for switching these estimating means according to a state of a channel,
wherein the switching control means includes Doppler-spectrum estimating means for estimating a Doppler spectrum for the OFDM signal received by the OFDM-signal receiving means and switching, according to the Doppler spectrum estimated by the Doppler-spectrum estimating means, the plural kinds of time-direction-channel estimating means used for the estimation of a channel characteristic, and
wherein the switching control means includes maximum-Doppler-frequency judging means for calculating a maximum Doppler frequency from the Doppler spectrum estimated by the Doppler-spectrum estimating means and switching the plural kinds of time-direction-channel estimating means according to the maximum Doppler frequency.

4. An OFDM receiver comprising:
OFDM-signal receiving means for receiving an orthogonal frequency division multiplexing (OFDM) signal;
channel-characteristic estimating means for estimating a channel characteristic using pilot signals in the OFDM signal received by the OFDM-signal receiving means; and
transmission-distortion compensating means for applying, on the basis of the channel characteristic estimated by the channel-characteristic estimating means, processing for compensating for transmission distortion to the OFDM signal received by the OFDM-signal receiving means,
wherein the channel-characteristic estimating means includes:
plural kinds of time-direction-channel estimating means used for the estimation of a channel characteristic; and
switching control means for switching these estimating means according to a state of a channel,
wherein the switching control means includes Doppler-spectrum estimating means for estimating a Doppler spectrum for the OFDM signal received by the OFDM-signal receiving means and switching, according to the Doppler spectrum estimated by the Doppler-spectrum estimating means, the plural kinds of time-direction-channel estimating means used for the estimation of a channel characteristic, and
wherein the switching control means includes fluctuation-type judging means for judging a shape of the Doppler spectrum estimated by the Doppler-spectrum estimating means and switching the plural kinds of time-direction-channel estimating means according to the shape of the Doppler spectrum.

5. An OFDM receiver according to claim 4, wherein the fluctuation-type judging means judges, from the shape of the Doppler spectrum estimated by the Doppler-spectrum estimating means, whether channel fluctuation is periodic fluctuation or random fluctuation.

6. An OFDM receiver according to claim 5, wherein the fluctuation-type judging means includes:
center clip means for applying center clip processing to the Doppler spectrum estimated by the Doppler-spectrum estimating means;
positive-maximum-Doppler searching means for searching for, for the Doppler spectrum to which the center clip processing is applied by the center clip means, a maximum positive index of a non-zero value;
negative-maximum-Doppler searching means for searching for a negative maximum index of a non-zero value;
counting means for counting, for the Doppler spectrum to which the center clip processing is applied by the center clip means, indexes of a value 0 between the positive maximum Doppler index detected by the positive-maximum-Doppler searching means and the negative maximum Doppler index detected by the negative-maximum-Doppler searching means; and
judging means for subtracting the negative maximum Doppler index detected by the negative-maximum-Doppler searching means from the positive maximum Doppler index detected by the positive-maximum-Doppler searching means to calculate a Doppler spread and, when the calculated Doppler spread is smaller than a threshold, judging that the channel is a channel without fluctuation, when the Doppler spread is equal to or larger than the threshold, judging that the channel fluctuation is periodic fluctuation when a section of a value 0 in the Doppler spread is larger than a threshold, and judging that the channel fluctuation is random fluctuation when the section is not larger than the threshold.

7. An OFDM receiver comprising:
OFDM-signal receiving means for receiving an orthogonal frequency division multiplexing (OFDM) signal;
channel-characteristic estimating means for estimating a channel characteristic using pilot signals in the OFDM signal received by the OFDM-signal receiving means; and
transmission-distortion compensating means for applying, on the basis of the channel characteristic estimated by the channel-characteristic estimating means, processing for compensating for transmission distortion to the OFDM signal received by the OFDM-signal receiving means,
wherein the channel-characteristic estimating means includes:
plural kinds of time-direction-channel estimating means used for the estimation of a channel characteristic; and
switching control means for switching these estimating means according to a state of a channel,
wherein the switching control means includes Doppler-spectrum estimating means for estimating a Doppler spectrum for the OFDM signal received by the OFDM-signal receiving means and switching, according to the Doppler spectrum estimated by the Doppler-spectrum estimating means, the plural kinds of time-direction-channel estimating means used for the estimation of a channel characteristic, and
wherein the switching control means includes:

maximum-Doppler-frequency judging means for calculating a maximum Doppler frequency from the Doppler spectrum estimated by the Doppler-spectrum estimating means and switching the plural types of time-direction-channel estimating means according to the maximum Doppler frequency; and fluctuation-type judging means for judging a shape of the Doppler spectrum estimated by the Doppler-spectrum estimating means and switching the plural kinds of time-direction-channel estimating means according to the shape of the Doppler spectrum.

8. An OFDM signal receiving method for use with an OFDM receiver of receiving an orthogonal frequency division multiplexing (OFDM) signal, estimating a channel characteristic using pilot signals in the received OFDM signal, and applying, on the basis of the estimated channel characteristic, processing for compensating for transmission distortion to the received OFDM signal, the OFDM signal receiving method comprising:

estimating a Doppler spectrum for the received OFDM signal;

calculating a maximum Doppler frequency from the estimated Doppler spectrum by use of a maximum-Doppler-frequency judging circuit; and switching by use of a selector, according to the maximum Doppler frequency, plural kinds of time-direction-channel estimating means used for the estimation of a channel characteristic.

9. An OFDM receiver comprising:

an OFDM-signal receiving unit receiving an orthogonal frequency division multiplexing (OFDM) signal;

a channel-characteristic estimating unit estimating a channel characteristic using pilot signals in the OFDM signal received by the OFDM-signal receiving unit; and a transmission-distortion compensating unit applying, on the basis of the channel characteristic estimated by the channel-characteristic estimating unit, processing for compensating for transmission distortion to the OFDM signal received by the OFDM-signal receiving unit, wherein the channel-characteristic estimating unit includes:

a plural kinds of time-direction-channel estimating unit used for the estimation of a channel characteristic; and a switching control unit switching these estimating units according to a state of a channel, in which the switching control unit includes maximum-Doppler-frequency judging unit to calculate a maximum Doppler frequency from an estimated Doppler spectrum for the OFDM signal, and in which the switching control unit controls the switching of the plural kinds of time-direction-channel estimating means according to the maximum Doppler frequency.

* * * * *